US007599484B2

(12) United States Patent
Nattkemper (10) Patent No.: US 7,599,484 B2
(45) Date of Patent: *Oct. 6, 2009

(54) ELEMENT MANAGEMENT SYSTEM FOR MANAGING LINE-POWERED NETWORK ELEMENTS

(75) Inventor: Dieter H. Nattkemper, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 567 days.

This patent is subject to a terminal disclaimer.

(21) Appl. No.: 10/449,682

(22) Filed: May 30, 2003

(65) Prior Publication Data

US 2004/0032947 A1 Feb. 19, 2004

Related U.S. Application Data

(63) Continuation-in-part of application No. 10/134,323, filed on Apr. 29, 2002, now Pat. No. 7,454,012.

(51) Int. Cl.
*H04M 1/02* (2006.01)
(52) U.S. Cl. .................. 379/413; 307/80; 320/116; 323/224; 323/312; 340/7.35; 370/311; 379/412; 455/522; 455/574; 713/300
(58) Field of Classification Search ................ 379/413.01–413.04, 413; 370/463, 311; 307/80; 320/116; 340/7.35; 323/224, 312; 455/522, 574; 713/300
See application file for complete search history.

(56) References Cited

U.S. PATENT DOCUMENTS 5,144,296 A * 9/1992 DeLuca et al. ............. 340/7.35

(Continued)

FOREIGN PATENT DOCUMENTS

WO  WO-00/41496  7/2000

(Continued)

OTHER PUBLICATIONS

Navini Networks, Source Objectivity Inc., "Navini Networks™ Selects Objectivity to Power Element Management System for Ripwave™ Normadic Wireless Broadband Technology", Jul. 23, 2001, PR Newswire . p. 1.*

(Continued)

*Primary Examiner*—Gerald Gauthier
(74) *Attorney, Agent, or Firm*—Fogg & Powers LLC (57) ABSTRACT

A method of managing power at an element management system for a power sourcing network element and a power sinking network element of an access network is provided. The method includes identifying a set of primitives for managing power usage at the power sinking network element associated with providing a provisioned service, provisioning at least one instance of a line power manager for the service with the set of primitives, provisioning at least one instance of an associated line power controller at each of the power sourcing network element and the power sinking network element, associating at least one conductive medium with the line power controller, the at least one conductive medium coupled between the power sourcing network element and the power sinking network element, and passing selected ones of the set of primitives to the power sourcing network element and the power sinking network element for use by at least one line power control function of the power sourcing and the power sinking network elements.

43 Claims, 6 Drawing Sheets

U.S. PATENT DOCUMENTS

| | | | |
|---|---|---|---|
| 5,283,905 A | | 2/1994 | Saadeh et al. |
| 5,301,225 A | * | 4/1994 | Suzuki et al. ............... 455/574 |
| 5,436,510 A | | 7/1995 | Gilbert |
| 5,600,228 A | | 2/1997 | Matsubayashi et al. |
| 5,627,833 A | | 5/1997 | Bliven |
| 5,630,168 A | | 5/1997 | Rosebrugh et al. |
| 5,666,538 A | | 9/1997 | DeNicola |
| 5,694,398 A | | 12/1997 | Doll et al. |
| 5,761,429 A | * | 6/1998 | Thompson .................. 709/224 |
| 5,774,689 A | * | 6/1998 | Curtis et al. .................. 703/21 |
| 5,777,769 A | * | 7/1998 | Coutinho .................... 398/171 |
| 5,818,125 A | * | 10/1998 | Manchester .................. 307/66 |
| 5,821,733 A | * | 10/1998 | Turnbull ..................... 320/116 |
| 5,825,674 A | | 10/1998 | Jackson |
| 5,924,015 A | | 7/1999 | Garrison et al. |
| 5,926,544 A | | 7/1999 | Zhou |
| 5,990,575 A | * | 11/1999 | Flaugher ...................... 307/23 |
| 5,991,635 A | * | 11/1999 | Dent et al. .................. 455/517 |
| 6,044,069 A | * | 3/2000 | Wan ........................... 370/311 |
| 6,167,330 A | | 12/2000 | Linderman |
| 6,176,710 B1 | | 1/2001 | Ewing et al. |
| 6,199,180 B1 | | 3/2001 | Ote et al. |
| 6,366,657 B1 | | 4/2002 | Yagel et al. |
| 6,396,849 B1 | | 5/2002 | Sarkissian et al. |
| 6,433,521 B1 | * | 8/2002 | Chen et al. .................. 323/224 |
| 6,496,515 B2 | | 12/2002 | Lefebvre et al. |
| 6,509,725 B1 | * | 1/2003 | Bernstein et al. ............ 323/312 |
| 6,546,089 B1 | | 4/2003 | Chea, Jr. et al. |
| 6,580,727 B1 | * | 6/2003 | Yim et al. .................... 370/463 |
| 6,587,953 B1 | | 7/2003 | Torikai |
| 6,606,383 B1 | | 8/2003 | Robinson et al. |
| 6,628,972 B1 | * | 9/2003 | Lee ............................. 455/574 |
| 6,885,745 B1 | * | 4/2005 | Handforth et al. ........... 379/412 |
| 6,926,544 B2 | | 8/2005 | Lee |
| 6,947,554 B2 | | 9/2005 | Freyman et al. |
| 6,978,014 B1 | * | 12/2005 | Bentley ....................... 379/413 |
| 7,099,934 B1 | | 8/2006 | Ewing et al. |
| 7,113,810 B2 | * | 9/2006 | Kim ............................ 455/574 |
| 7,190,785 B2 | * | 3/2007 | Hein et al. ................... 379/413 |
| 7,242,764 B2 | * | 7/2007 | Miyamoto ................... 379/413 |
| 7,254,413 B2 | * | 8/2007 | Muller et al. ................ 455/522 |
| 7,293,182 B2 | * | 11/2007 | Diab et al. ................... 713/300 |
| 7,456,522 B2 | * | 11/2008 | Priest ........................... 307/80 |
| 2002/0002593 A1 | | 1/2002 | Ewing et al. |
| 2002/0044525 A1 | | 4/2002 | Czerwiec et al. |
| 2002/0117899 A1 | * | 8/2002 | Seefried et al. ............... 307/64 |
| 2002/0158689 A1 | | 10/2002 | Harris et al. |
| 2003/0003941 A1 | * | 1/2003 | Goto et al. ................... 455/522 |
| 2003/0014677 A1 | | 7/2003 | Howard et al. |
| 2003/0126195 A1 | | 7/2003 | Reynolds |
| 2003/0154276 A1 | * | 8/2003 | Caveney ...................... 709/223 |
| 2003/0185385 A1 | | 10/2003 | Boudreaux, Jr. et al. |
| 2003/0202655 A1 | * | 10/2003 | Nattkemper et al. ......... 379/413 |
| 2004/0017911 A1 | * | 1/2004 | Nattkemper ............ 379/399.01 |
| 2004/0031030 A1 | * | 2/2004 | Kidder et al. ................ 717/172 |
| 2004/0196134 A1 | * | 10/2004 | Milanczak ................... 337/187 |
| 2005/0064914 A1 | * | 3/2005 | Gough ......................... 455/567 |
| 2005/0163152 A1 | | 7/2005 | Binder |
| 2006/0136625 A1 | | 6/2006 | Kao et al. |
| 2006/0143344 A1 | * | 6/2006 | Lindsay et al. .............. 710/105 |

FOREIGN PATENT DOCUMENTS

| | | |
|---|---|---|
| WO | WO-01/58123 | 8/2001 |
| WO | 0235906 | 5/2002 |
| WO | 03014958 | 2/2003 |

OTHER PUBLICATIONS

European Patent Office, "European Search Report", Mar. 31, 2009, Published in: EP.

* cited by examiner

ELEMENT MANAGEMENT SYSTEM FOR MANAGING LINE-POWERED NETWORK ELEMENTS

CROSS REFERENCE TO RELATED APPLICATIONS

This application is a continuation-in-part of application Ser. No. 10/134,323, filed on Apr. 29, 2002 now U.S. Pat. No. 7,454,012 and entitled MANAGING POWER IN A LINE POWERED NETWORK ELEMENT (the '323 Application). The '323 Application is incorporated herein by reference.

This application is also related to the following applications filed on even date herewith:

application Ser. No. 10/449,259, entitled "Line-Powered Network Element," (the '359 Application); and application Ser. No. 10/449,910, entitled "FUNCTION FOR CONTROLLING LINE POWERING IN A NETWORK," (the '358 Application).

The '358 and '359 Applications are incorporated herein by reference.

BACKGROUND

Telecommunications networks transport signals between user equipment at diverse locations. A telecommunications network includes a number of components. For example, a telecommunications network typically includes a number of switching elements that provide selective routing of signals between network elements. Additionally, telecommunications networks include communication media, e.g., twisted pair, fiber optic cable, coaxial cable or the like that transport the signals between switches. Further, some telecommunications networks include access networks.

For purposes of this specification, the term "access network" means a portion of a telecommunication network, e.g., the public switched telephone network (PSTN), that allows subscriber equipment or devices to connect to a core network. For purposes of this specification, the term access network further includes customer located equipment (CLE) even if commonly considered part of an enterprise network. Examples of conventional access networks include a cable plant and equipment normally located in a central office or outside plant cabinets that directly provides service interface to subscribers in a service area. The access network provides the interface between the subscriber service end points and the communication network that provides the given service. An access network typically includes a number of network elements.

A network element is a facility or the equipment in the access network that provides the service interfaces for the provisioned telecommunication services. A network element may be a stand-alone device or may be distributed among a number of devices. A network element is either central office located, outside plant located, or customer located equipment (CLE). Some network elements are hardened for outside plant environments. In some access networks as defined herein, various network elements may be owned by different entities. For example, the majority of the network elements in an access network may be owned by one of the Regional Bell Operating Companies (RBOCs) whereas the CLE may be owned by the subscriber. Such subscriber equipment is conventionally considered part of the subscriber's enterprise network, but, for purposes of this specification may be defined to part of the access network.

There are a number of conventional forms for access networks. For example, the digital loop carrier is an early form of access network. The conventional digital loop carrier transported signals to and from subscriber equipment using two network elements. At the core network side, a central office terminal is provided. The central office terminal is connected to the remote terminal over a high-speed digital link, e.g., a number of T1 lines or other appropriate high-speed digital transport medium. The remote terminal of the digital loop carrier typically connects to the subscriber over a conventional twisted pair drop.

The remote terminal of a digital loop carrier is often deployed deep in the customer service area. The remote terminal typically has line cards and other electronic circuits that need power to operate properly. In some applications, the remote terminal is powered locally. Unfortunately, to prevent failure of the remote terminal due to loss of local power, a local battery plant is typically used. This adds to the cost and complicates the maintainability of the remote terminal, due to the outside plant operational requirements which stipulate operation over extended temperature ranges.

In some networks, the remote terminal is fed power over a line from the central office. This is referred to as line feeding or line powering and can be accomplished through use of an AC or a DC source. Thus, if local power fails, the remote terminal still functions because it is typically powered over the line using a battery-backed power source. This allows the remote terminal to offer critical functions like lifeline plain old-fashioned telephone service (POTS) even during a power outage.

Over time, the variety of services offered over telecommunications networks has changed. Originally, the telecommunications networks were designed to carry narrowband, voice traffic. More recently, the networks have been modified to offer broadband services. These broadband services include services such as digital subscriber line (DSL) services. As time goes on, other broadband services will also be supported. These new services often come with increased power requirements.

As the service offerings have changed, the manner in which remote terminals are powered has not changed. The various services now offered are not all on equal footing. Data service today, unlike lifeline POTS, typically is not considered a necessity. Further, even among the other broadband services, there is a spectrum of variables affecting the level of service that a given subscriber wants and what the subscriber is willing to pay for it. Despite these changes in service offerings, the way that power is provided to the access equipment has not changed to keep pace with the service advancements.

Therefore, there is a need in the art for improvements in the manner in which power is provided to network elements in an access network.

SUMMARY

Embodiments of the present invention address problems with providing power to network elements in an access network. Particularly, embodiments of the present invention provide power management for line powered network elements. Embodiments of the present invention provide a line power manager that runs on an element management system. The power manager provisions a power controller associated with the network element with at least one power criterion to use in controlling the operation of the network element based on a monitored power condition.

A method of managing power at an element management system for a network element of an access network is provided. The method includes identifying a set of primitives for managing power usage at the network element associated with providing a provisioned service, provisioning at least one instance of a line power manager for the service with the set of primitives, and passing selected ones of the set of primitives to the network element being managed for use by at least one line power control function of the network element.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide management of line powered network elements in an access network. A number of embodiments are described in detail below. As an overview, the various embodiments manage the operation of the line powered network elements based on selectable "primitives." These primitives provide information and parameters that define a set of actions and criteria for managing services provisioned on the network element under various power conditions. For example, primitives define action or power criteria for managing the network element based on factors such as available power, power head-room, priority of services, or terms of service level agreements for various subscribers. A listing of examplary primitives is found in co-pending application Ser. No. 10/449,910 (pending) (the '358 Application).

In general, a line power manager establishes primitives for the managed network element and the provisioned services on the managed network element. A line power controller communicates with the power manager and uses the primitives to control the operation of the network element based on monitored power conditions of the network element. For example, the operation of the network element is selectively adjusted when power is lost or degraded, e.g., components of the network element are placed in low power mode, functions are disabled, or ports or services are selectively turned off.

Power based management of network elements provides many advantages in the operation of an access network. First, managed power results in higher efficiencies which permits an overall power savings. This translates into cost savings. Further, high power efficiency permits longer reach for a network element into the customer service area. Service intervals can also be scheduled or deferred for extended periods when power headroom is designed into power managed access networks. Also, power management can assure that priority services remain operational during element faults and battery plant faults, e.g., through use of a controlled service shut down based on priority of service and timed events. Finally, power management at the network element allows flexibility in creating differentiated services. For example, a selected data service at a moderate priority level may be provisioned to operate for a selected period of time when a power failure causes a switch over to a battery back-up power source.

A number of embodiments are described below. Section I gives an overview of one embodiment of a power management scheme. Section II describes various aspects of the element management system (EMS) used to implement the power management scheme. The '359 Application describes one embodiment of a line-powered network element that is adapted to operate in conjunction with the element management system described herein to implement the power management scheme.

I. Overview

Figure 1:
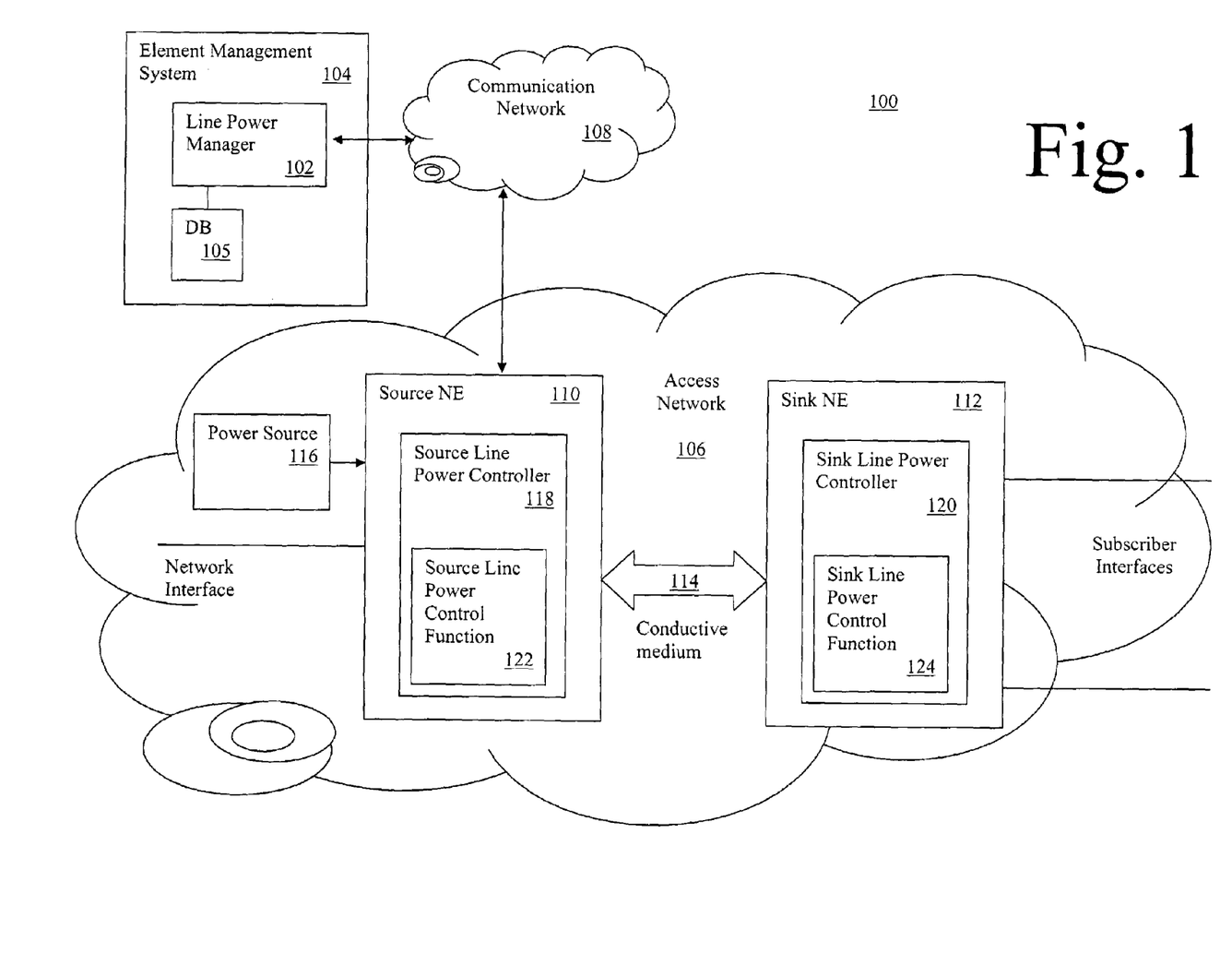
FIG. 1 is a bock diagram of one embodiment of an access network with a power management application.

FIG. 1 is a block diagram of an embodiment of a system, indicated generally at 100, that provides power management for line-powered network elements within access network 106 using a power management application running on element management system (EMS) 104. The power management application, in one embodiment, instantiates line power managers, represented by line power manager 102 of FIG. 1, to manage power for the line-powered network element. In one embodiment, line power manager 102 manages network elements, e.g., power sourcing network element (Source NE) 110 and power sinking network element (Sink NE) 112, through one or more power controllers, e.g., source line power controller 118 and sink line power controller 120, based on one or more primitives. In one embodiment, Sink NE 112 is a Remote Terminal (RT) and Source NE 110 is a Central Office Terminal (COT) in a line-powered, digital loop carrier system. In other embodiments, Sink NE 112 is customer premises equipment (CPE) such as a DSL modem, an integrated access device or other network element conventionally considered as part of an enterprise network. In general, Sink NE 112 provides an interface to subscriber equipment and Source NE 110 provides an interface to a network, e.g., a data network such as the Internet. Source NE 110 provides power to Sink NE 112 over conductive medium 114. In one embodiment, conductive medium 114 comprises one or more conductive cables, e.g., one or more twisted pair telephone lines, coaxial cables, or other appropriate conductive medium. In one embodiment, conductive medium 114 carries communication signals in addition to power signals between Source NE 110 and Sink NE 112.

The power management application includes machine-readable instructions stored on a machine-readable medium for running on a programmable processor of EMS 104 to implement a method for power manager 102. For purposes of this specification, a "machine-readable medium" includes, but is not limited to, random access memory (DRAM, SRAM), Flash memory, read only memory (ROM), electrically erasable programmable read only memory (EEPROM), optical or magnetic based storage medium, or other appropriate storage medium. Further, for purposes of this specification, an element management system is a system with functions that are adapted to provide administration for one or more access networks and a plethora of network elements in the access network, e.g., a central office terminal, a remote terminal, customer premises equipment, etc. The functions of an EMS include provisioning, status performance monitoring, alarming for critical functions, report generation, statistics charting and many other functions. The man-machine interface for EMS 104 typically comprises a graphical user interface. In one embodiment, EMS 104 supports multiple instantiations of line power manager 102. Each of the instantiations implements the same or different types of power management functions.

Line power manager 102 establishes a set of primitives for controlling services provided by a network element, e.g., Source NE 110 and Sink NE 112, based on power conditions. Further, line power manager 102 manages the provisioned primitives in an associated database (DB) 105 such as described in co-pending application Ser. No. 10/134,323, filed on Apr. 29, 2002 and entitled MANAGING POWER IN A LINE POWERED NETWORK ELEMENT (the '323 Application). The '323 Application is incorporated herein by reference. In one embodiment, database 105 maintains a listing of all primitives assigned to all network elements in access network 106. Further, each network element maintains a subset of database 105 for the primitives associated with the network element.

Line power manager 102 communicates with source line power controller 118 and sink line power controller 120 over an appropriate management interface, e.g., communication network 108. This management interface is accomplished with any known or later developed management interface, e.g., SNMP or other appropriate management interface. In one embodiment, line power manager 102 communicates with source line power controller 118 and sink line power controller 120 as defined in a management information base (MIB) for the power management application.

In one embodiment, source line power controller 118 and sink line power controller 120 are implemented as machine readable instructions stored on a machine readable medium and run on an embedded processor. Further, in one embodiment, power management at the Source NE 110 is implemented through source line power controller 118 in combination with one or more source line power control functions 122. Similarly, power management at the Sink NE 112 is implemented through sink line power controller 120 in combination with one or more sink line power control functions 124. In one embodiment, source line power control functions 122 and sink line power control functions 124 are implemented as described in the '358 Application.

Power is provided to Source NE 110 and Sink NE 112 from one or more of power sources 116. The possible locations of the power source with respect to access network 106 and the line-powered network elements is described in detail in the '323 Application which application is incorporated herein by reference.

Source NE 110 and Sink NE 112 are coupled together over conductive medium 114. In one embodiment, conductive medium 14 comprises one or more communication lines, e.g., copper cables, twisted pair, etc. In one embodiment, conductive medium 114 transports both power and communication signals between Source NE 110 and Sink NE 112. In one embodiment, conductive medium 114 comprises a number of links providing one or more media interfaces for Source NE 110 and Sink NE 112. Each link is adapted to carry both power and communication signals. Conductive medium 114, in one embodiment, comprises a power interface for transporting power between Source NE 110 and Sink NE 112, a management communication interface for carrying management information, e.g., primitives, between Source NE 110 and Sink NE 112, and a digital communication interface for providing communications signals between Source NE 110 and Sink NE 112.

In operation, line power manager 102 manages the operation of Source NE 110 and Sink NE 112 based on one or more primitives stored in database 105 to provide managed power from Source NE 110 to Sink NE 112. Line power manager 102 selects and provides the one or more primitives to source line power controller 118 and sink line power controller 120. Source line power controller 118 and sink line power controller 120 are selectively associated with conductive medium 114 to provide power from Source NE 110 to Sink NE 112.

In one embodiment, line power manager 102 establishes the at least one power criterion as part of a "flow through" provisioning for a service provided at Sink NE 112. In one embodiment, line power manager 102 establishes the at least one power criterion either through explicit or implicit selection (also called "flow through" provisioning elsewhere herein) as described in more detail below with respect to FIG. 3.

The provisioned line power controllers, e.g., source line power controller 118 and sink line power controller 120, monitor the operation of Source NE 110 and Sink NE 112, respectively, through the provisioned primitives. If power fails or degrades, the source line power controller 118 and the sink power controller 120 detect and report the power condition using appropriate primitives and make any necessary adjustments to the operation of Source NE 110 and Sink NE 112 based on the current power conditions. For example, in one embodiment, sink line power controller 120 shuts down services according to a priority scheme until the appropriate power consumption level is achieved when power available at Sink NE 112 is degraded. Any appropriate priority scheme can be used. For example, priority based on service type, port number, service level agreements, random, or other appropriate scheme. In other embodiments, sink line power controller 120 places components Sink NE 112 in low power mode. The use of low power mode can also be implemented according to a priority scheme.

II. Element Management System

This section describes various aspects of an element management system. First, an embodiment of an element management system is described in conjunction with FIG. 2. Further, embodiments of various procedures used by the power management application running on the element management application are described in conjunction with FIGS. 3-9. Each of FIGS. 2-9 are described below.

Figure 2:
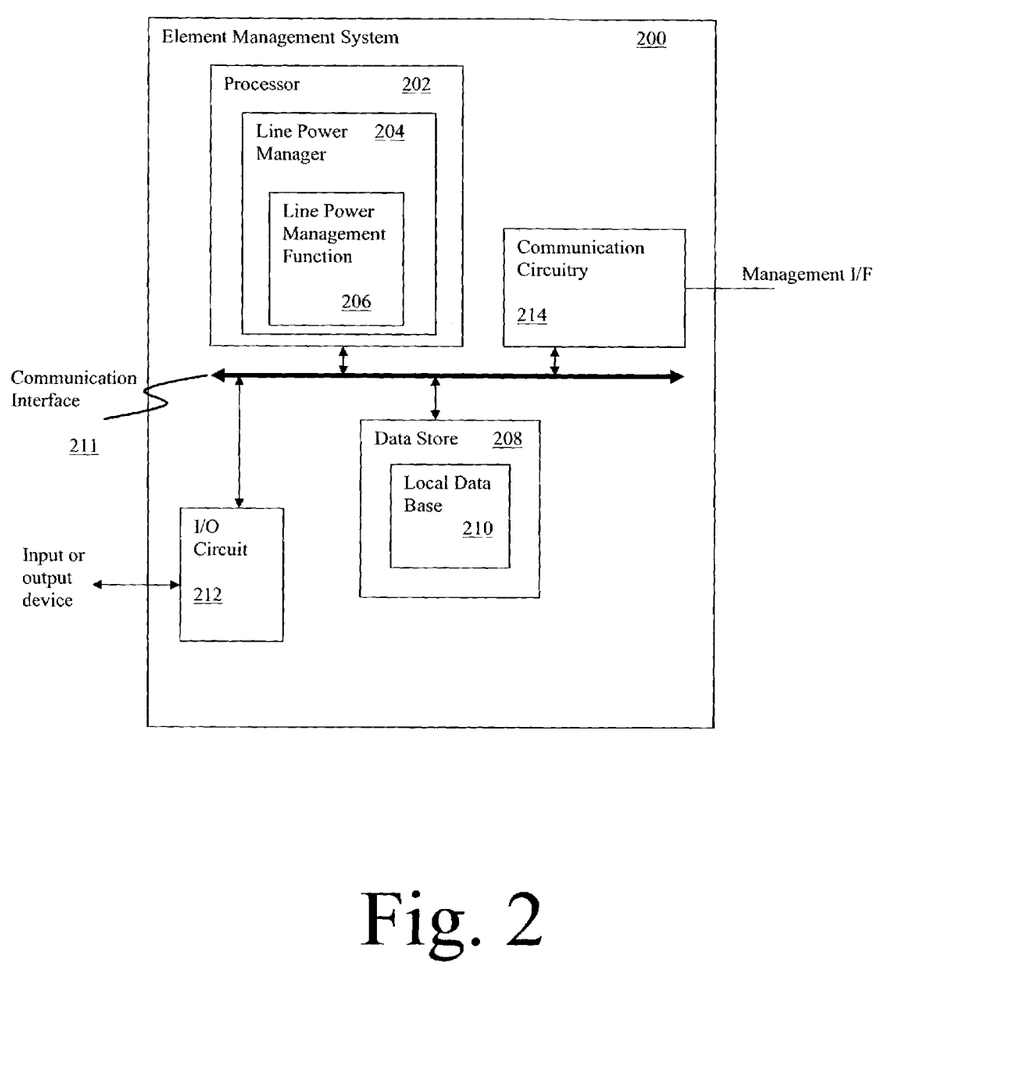
FIG. 2 is a block diagram of one embodiment of an element management system that runs a power management application for line-powered network elements.

FIG. 2 is a block diagram of an element management system, indicated generally at 200, according to the teachings of the present invention. Element management system 200 includes programmable processor 202 that runs a power management application for providing management of line-powered network elements in an access network. In one embodiment, the power management application is stored as a plurality of procedures or programs with machine readable instructions stored in a machine readable medium, for example, non-volatile memory of data store 208. In one embodiment, data store 208 comprises one or more of a magnetic storage medium such as a disk drive, dynamic random access memory (DRAM, SRAM), Flash memory, read only memory (ROM), electrically erasable programmable read only memory (EEPROM), or other appropriate storage medium. The procedures and programs stored in data store 208 cause processor 202 to perform the functions described below.

For each service instance running on the line-powered network element, element management system 200 instantiates an instance of a line power manager represented by line power manager 204. In one embodiment, a given instance of a line power manager invokes a number of associated line power management functions represented here by line power management function 206. It is understood that in a particular embodiment, any appropriate number of instances of a line power manager and line power management functions are instantiated by element management system 200. For simplicity, only a single line power manager and a single line power control function are shown here.

Element management system 200 also includes data store 208. Data store 208, among other things, stores one or more databases 210 used by the power management application. For example, in one embodiment, database 210 stores data for each instance of a line power manager running on processor 202. This data includes, for example, the identity of the line power manager instance along with primitives associated with the instance of the line power manager. In other embodiments, other appropriate databases are also maintained in data store 208.

Element management system 200 also includes input/output (I/O) circuit 212. I/O circuit 212 provides a user interface to element management system 200. In one embodiment, I/O circuit 212 provides an interface for a craft port to element management system 200. Further, in other embodiments, I/O circuit 212 exchanges information via a graphical user interface. In other embodiments, I/O circuit 212 interfaces with other known or later developed input/output devices, including a keyboard, a mouse, a touch screen, voice recognition circuitry or software, etc.

Element management system 200 also includes communication circuit 214 that provides a management interface for the line-powered network element. Through this interface, information is communicated to and from the line-powered network element to effectuate management of the power aspects of the line-powered network element. The parameters of the communication over this interface are defined, in one embodiment, using a management information base (MIB) and a standard protocol such as SNMP. In other embodiments, other known or later developed management protocols are used.

Element management system 200 also includes communication interface 211. In one embodiment, communication interface 211 comprises one or more busses for carrying signals between the various components of element management system 200. In one embodiment, communication interface 211 is coupled to processor 202, data store 208, I/O circuit 212, and communication circuitry 214.

Various aspects of the operation of element management system 200 are described below with respect to FIGS. 3-9.

Figure 3:
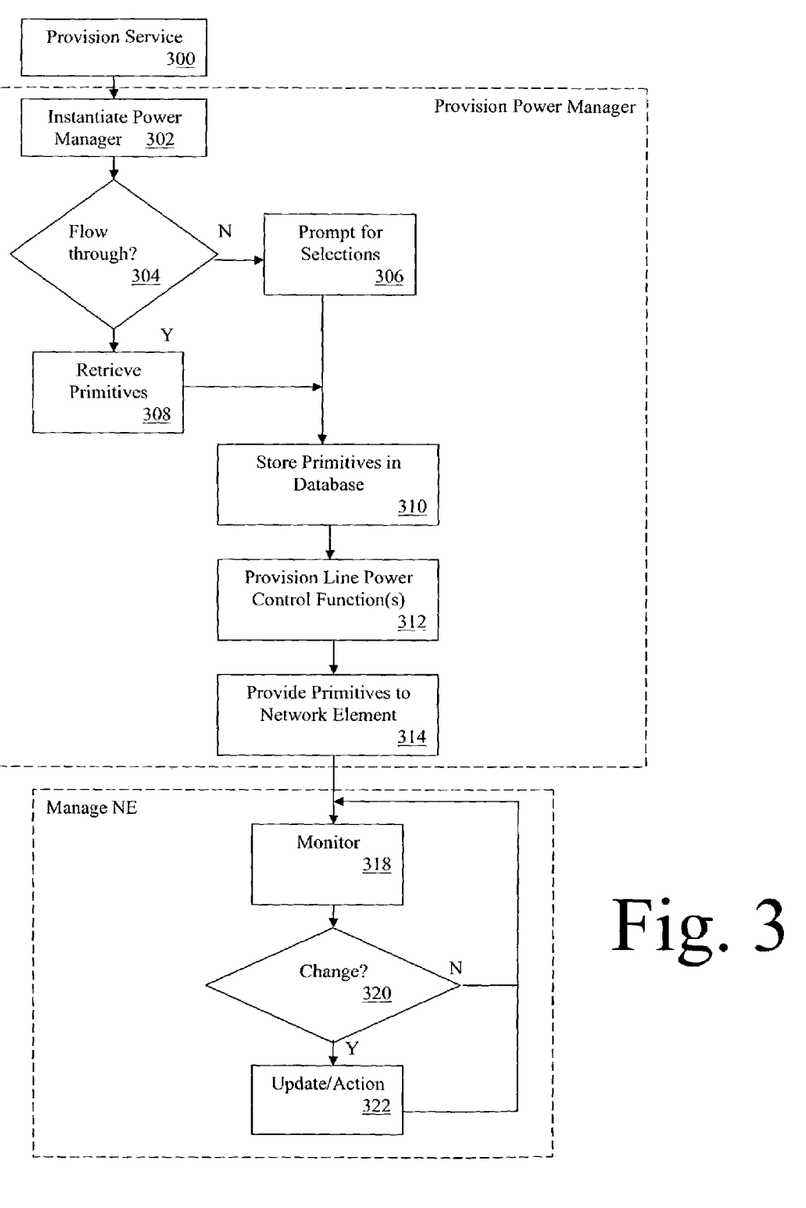
FIG. 3 is a flow chart of one embodiment of a process for provisioning a line power manager running on an element management system and for managing a line-powered network element with the line power manager.

FIG. 3 is a flow chart of one embodiment of a process for provisioning a line power manager and managing a line-powered network element using element management system 200 of FIG. 2. In one embodiment, this process runs on processor 202 of element management system 200. Element management system 200 provides provisioning, performance monitoring and alarming functions.

Instances of the power management application, referred to as line power manager 204 of FIG. 2, control the operation of services provisioned on the line-powered network element based on the power conditions for the network element. For purposes of this specification, a single instance of the power management application, referred to as the line power manager, is described. It is understood, however, that in normal operation of the access network, many instances of the power management application run simultaneously on the EMS platform to control the various services provisioned in the line powered network element or elements.

The process of the power management application begins at block 300 with the provisioning of a service on the managed, line-powered network element. For example, a new POTS, DSL or other appropriate voice or data service is provisioned for a subscriber associated with the managed, line-powered network element. Once the service is provisioned, the process instantiates a power manager at block 302 for the provisioned service provided at the managed, line-powered network element.

FIG. 3 illustrates an embodiment of a process with two techniques for provisioning the line power manager 204 on element management system 200. One technique is a "flow through" provisioning (also called implicit provisioning elsewhere herein) of line power manager 204 based on the provisioned service. The other technique is an explicit provisioning of line power manager 204 in which a user provides input to provision the line power manager. As described in more detail below, the user either selects individual criterion to provision the line power manager for the provisioned service, or, selects a provisioned set of criteria known as a "power profile" for the provisioned service. In other embodiments, the power management application only uses one of the two techniques to instantiate the line power manager 204. For ease of illustration, the two techniques are combined as alternative branches from block 304 in the flow chart of FIG. 3.

At block 304, the process determines whether the power criteria are to be selected based on flow through provisioning or explicit selection. Flow through provisioning is an implicit provisioning of the line power manager 204. Implicit selection is accomplished by associating a selected "power profile" with a type of service. A power profile is defined through a function of the power management application described below with respect to FIG. 6. Each power profile is identified by a "service identifier" and includes a selected set of primitives, triggers, criteria, thresholds, etc. Each power profile further identifies the association of each primitive, trigger, criteria, threshold, etc. with either a Source NE, a Sink NE or both. A service identifier and its associated power profile is provisioned, for example, through a graphical user interface, a command from a north bound interface, etc. Once established, the power profile can be modified as necessary. Thus, when the service to be provisioned is selected, the power profile associated with that service, and thus the necessary primitives, automatically flows through to the managed, line-powered network element on which the service is provisioned.

If implicit provisioning is used, the process retrieves the primitives associated with the selected service from database 210 of FIG. 2 at block 308. These primitives are the primitives necessary to implement one or more power management functions for the provisioned service. In one embodiment, this includes primitives for controlling a line-powered network element such as Sink NE 112 subtended from Source NE 110 of FIG. 1. For example, the set of provisioned primitives for the service describe the interface between the line power manager 102 and the source line power control function 122 and a set of primitives that describe the interface between the line power manager 102 and the sink line power control function 124. These primitives control and monitor the status of power management within Source NE 110 and Sink NE 112. In addition to these primitives, in one embodiment, the provisioned set of primitives describe an interface between the source line power controller 118 and source line power control function 122 and a set of primitives that describe an interface between the sink line power controller 120 and sink line power control function 124. These primitives control and monitor the status of line power control functions within Source NE 110 and Sink NE 112.

If, at block 304, it is determined that flow through provisioning is not used, the method proceeds to block 306 to begin explicit selection of the power criteria for the provisioned service. At this point, the user is given an opportunity to select individual primitives and their associated triggers, criteria, thresholds, etc. Alternatively, explicit provisioning is accomplished by selectively associating a service with at least one power profile, e.g., through a user interface of the EMS.

Once the primitives are selected either explicitly (306) or implicitly (308), the process proceeds to block 310 and stores the primitives associated with the provisioned service in database 210. One embodiment of a process for storing the primitives in database 210 is described below with respect to FIG. 8.

At block 312, the process provisions the line power management functions for element management system 200 and line power control functions for the associated Sink NE and Source NE. These functions are used to implement the management of the line-powered network element. The functions use the provisioned primitives to carry out the management of the line-powered network element. Further, the process also associates conductive medium with the line power control functions for carrying power from the Source NE to the Sink NE.

At block 314, the process provides the primitives to the managed, line-powered network element. In one embodiment, this includes providing a set of primitives to a source network element, e.g., a central office terminal, and another set of primitives to a sink network element, e.g., a remote terminal, customer located equipment, etc. The primitives are provided to the line powered network element using any appropriate protocol, e.g., simple network management protocol (SNMP) or any other existing or later developed transport protocol.

Once provisioned, the power manager 204 manages the line-powered network element at block 316. The provisioned primitives provide the basis for implementing a power management scheme for the line-powered network element. For example, in one embodiment, the primitives provide for two levels of power management for the network element. At a first level, the primitives provide for control at a coarse level, e.g., assemblies, sub-assemblies, common logic assemblies. At a second level, the primitives provide for control at a fine granularity, e.g., digital logic, analog logic, and logic related to the provisioning of the service being instantiated.

At block 318, the process monitors primitives associated with the power management process. For example, in one embodiment, the process monitors the primitives to determine when a power alarm condition exists at the line powered network element.

At block 320, the process determines whether an action is necessary based on the monitored condition. If at block 320, action needs to be taken, the action is taken at block 322. For example, in one embodiment, the process determines from monitored primitives when an alarm condition exists at the line powered network element. The process then displays the alarm condition on a monitor at 322 using, e.g., a graphical user interface. In one embodiment, this includes displaying alarm conditions based on provisioned power alarm severity and power alarm thresholds, e.g., yellow, orange and red alarms. In one embodiment, the power alarms are displayed in association with the topology of the access network element.

Figure 4:
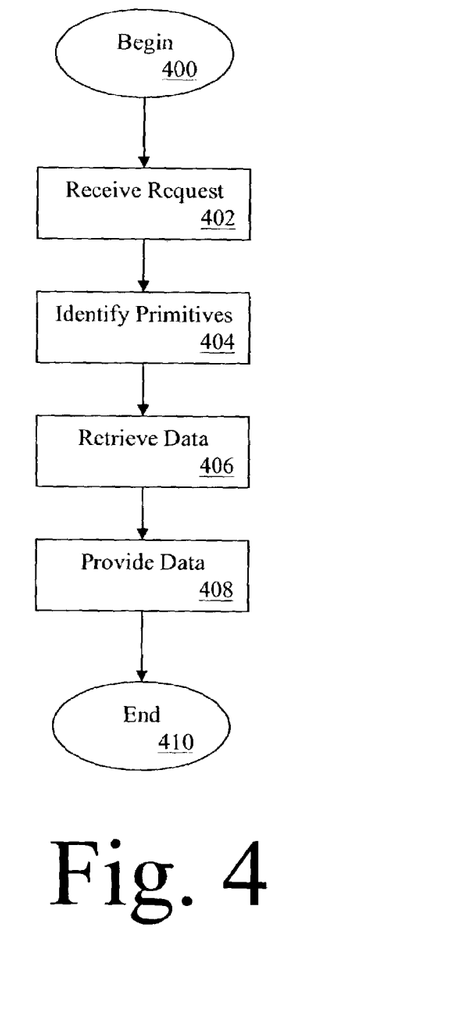
FIGS. 4 and 5 are flow charts of embodiments of output procedures for an element management system.
Figure 5:
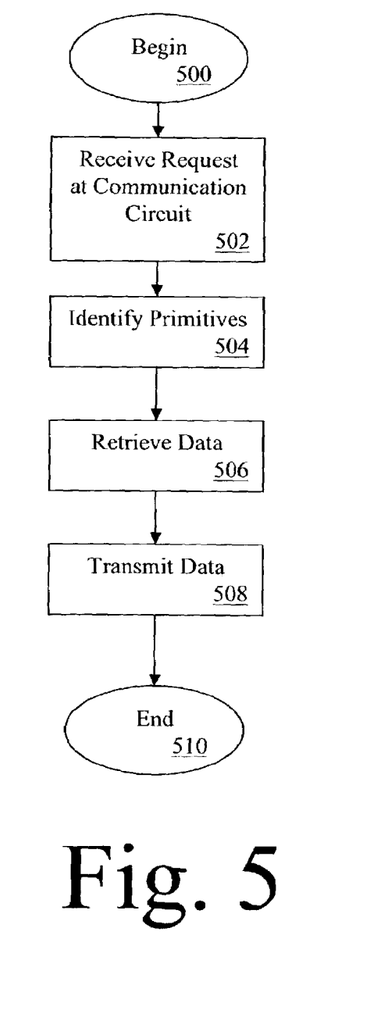

FIGS. 4 and 5 are flow charts of embodiments of output procedures for an element management system. Each instance of the power manager 204 monitors various conditions of the managed, line-powered network element based on the provisioned primitives. The power manager 204 thus receives status and alarm data from the line-powered network element through the provisioned primitives. The interface between the power manager of the element management system and the line-powered network element, in one embodiment, is provided using any proprietary or standards based MIB with SNMP or other management communication protocol. The power manager 204 provides access for a user to this data in at least two ways. First, the power manager 204 provides access to the data through a craft port coupled to I/O circuit 212. Data is retrieved from the craft port using a procedure shown in FIG. 4. Further, data is also provided to a user at a remote monitoring station over a network connection using the process shown in FIG. 5.

The process for providing data to a craft port begins at block 400 of FIG. 4. At block 402, the process receives a request to display data for a monitored line-powered network element. At block 404, the process identifies the primitives associated with the line-powered network element. At block 406, the process retrieves data from database 210 that indicates the current conditions being monitored at the line-powered network element. At block 408, the process provides the data to the craft port on I/O circuit 212 for display to the user. The process ends at 410. In one embodiment, the process further updates the data displayed at the craft port when the monitored data changes values.

The process for providing data to a remote monitoring station begins at block 500 of FIG. 5. At block 502, the process receives a request from a remote monitoring station at communication circuit 214. At block 504, the process identifies the primitives associated with the line-powered network element. At block 506, the process retrieves data from database 210 that indicates the current conditions being monitored at the line-powered network element. At block 508, the process provides the data to the remote monitoring station through communication circuit 214 for display to the user. The process ends at 510. In one embodiment, the process further updates the data displayed at the remote monitoring station when the monitored data changes values.

Figure 6:
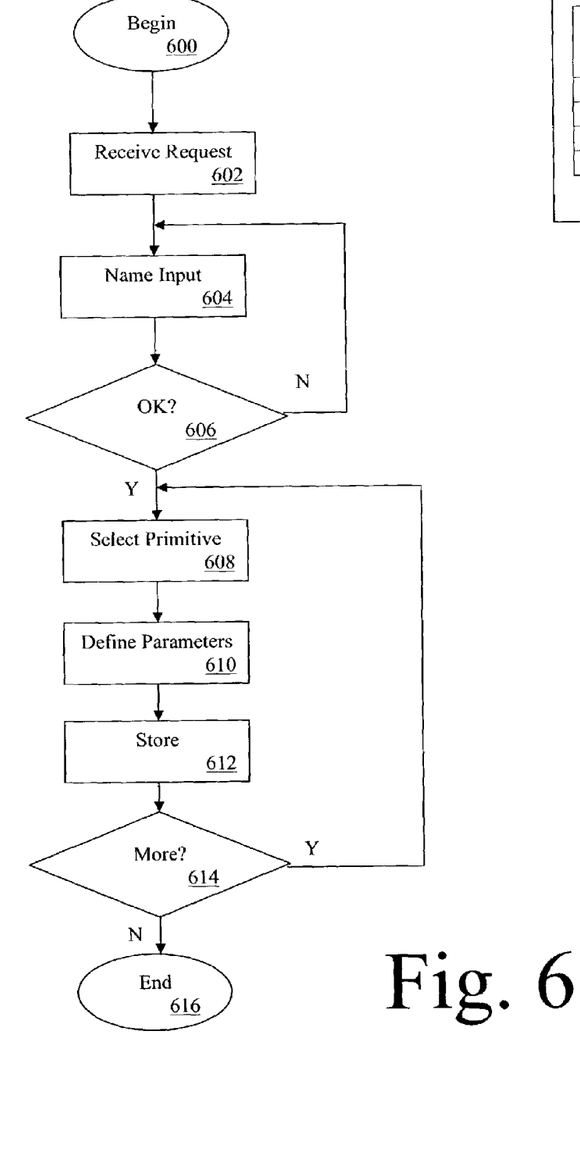
FIG. 6 is a flow chart for an embodiment of a process for initializing a power profile for use by a power management application.
Figure 7:
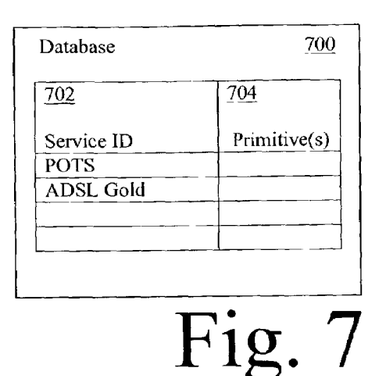
FIG. 7 is a graphical representation of a database for tracking primitives associated with a power profile in an element management system.

FIG. 6 is a flow chart for an embodiment of a process for initializing a power profile for use by a power management application. The process begins at block 600. At block 602, the process receives a request for a new power profile. At block 604, the process receives a proposed name for the power profile. At block 606, the process determines if the proposed name is acceptable, e.g., the name has not been used for another power profile and does not violate naming rules. At block 608, the process receives a primitive selection from a user. At block 610, the process receives values for parameters for the selected primitive. For example, the process receives values for triggers, criterion, thresholds and other parameters of the selected primitive. Further, the process receives an association for each primitive with either the Source NE, the Sink NE or both. The process stores the received values in database 210 for the power profile at block 612. An example of a database structure for storing power profiles is provided in tabular form in FIG. 7. Database 700 includes two columns of associated data. The first column 702 stores the service identifier for the power profile. The second column 704 identifies the primitives, and their corresponding parametric values, for the power profile with the service identifier provided in column 702 of the same row of the database 700.

At block 614, the process determines whether additional primitives are to be selected. If so, the process returns to block 608 for the next primitive to be selected. If not, then the process ends at block 616.

Figures 8, 9:
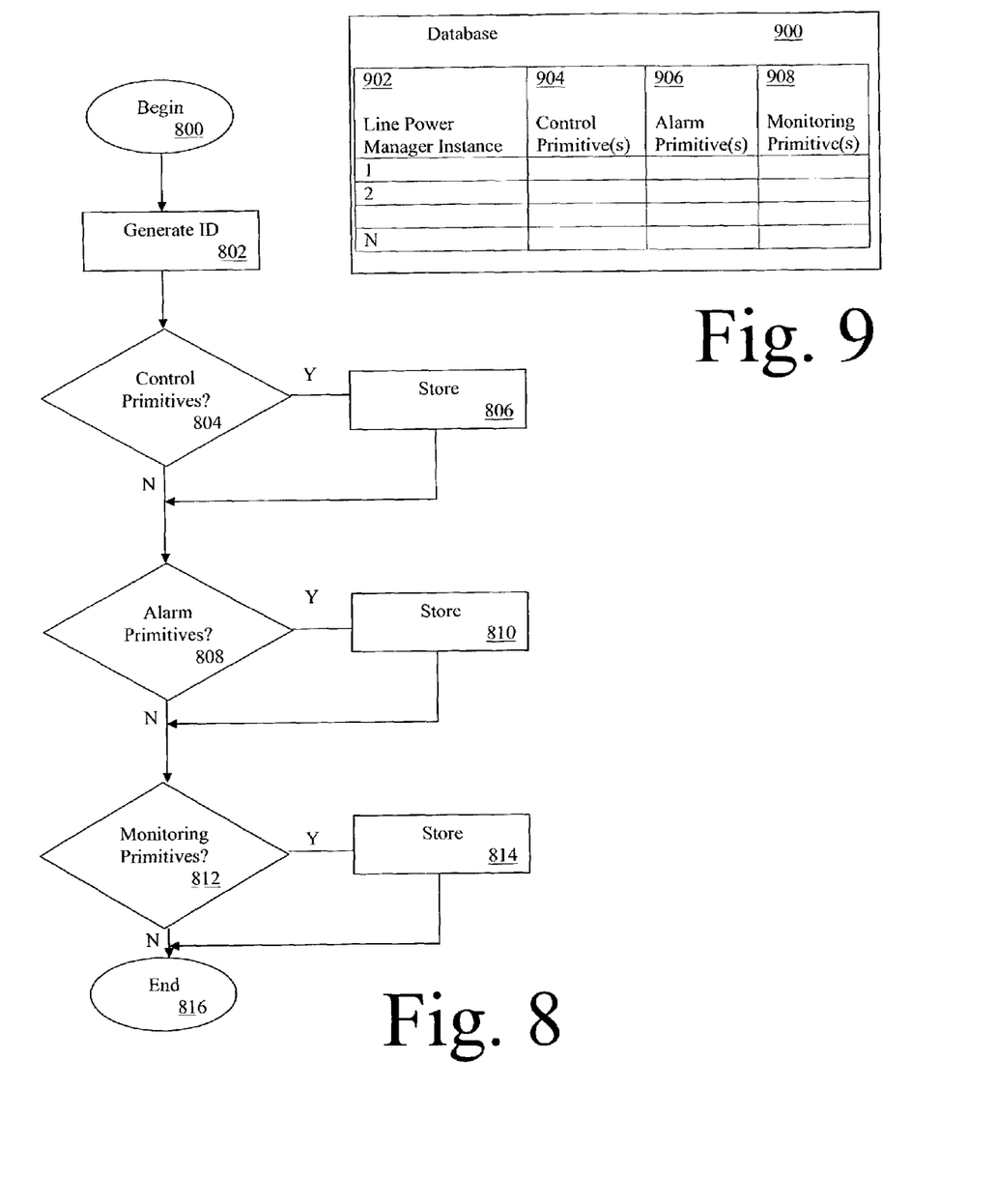
FIG. 8 is a flow chart of a process for storing primitives in a database for each power manager instance in an element management system.
FIG. 9 is a graphical representation of a database for tracking primitives associated with instances of power managers in an element management system.

FIG. 8 is a flow chart of a process for storing primitives in a database for each line power manager instance in element management system 200. The process begins at block 800. At block 802, an identifier (ID) for the line power manager instance is generated. This identifier is stored in a database such as column 902 of database 900 of FIG. 9. Once the identifier is generated, the primitives are stored in data base 900. At block 804, the process determines if there are any control primitives associated with the line power manager instance. If so, the control primitives are stored at block 806 in column 904 in the row associated with the line power manager instance. If not, the process proceeds to block 808. At block 808, the process determines if there are any alarm primitives associated with the line power manager instance. If so, the alarm primitives are stored at block 810 in column 906 in the row associated with the line power manager instance. If not, the process proceeds to block 812. At block 812, the process determines if there are any monitoring primitives associated with the line power manager instance. If so, the monitoring primitives are stored at block 814 in column 908 in the row associated with the line power manager instance. If not, the process ends at block 816. In other embodiments, the primitives are stored as they are received and are stored in the appropriate location in database 900 based on the type of primitive and the line power manager instance.

Although the processes of FIGS. 3, 4, 5, 6 and 8 have been described in terms of element management system 200, it is understood that in other embodiments, the processes are run on element management systems with different configurations. Further, in other embodiments, other processes are used to implement the various functions of instantiating a power manager instance, generating power profiles, storing primitives in a database for a line power manager instance and monitoring status and alarm information. The processes described in this application are provided by way of illustration and not by way of limitation.

Although the processes shown in FIGS. 3-6, and 8 are depicted as sequential steps, this functionality can be implemented in many ways using conventional or later developed programming techniques. Further, the processes and techniques described here may be implemented in digital electronic circuitry, or with a programmable processor (for example, a special-purpose processor or a general-purpose process such as a computer), firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the scope of the claimed invention. Accordingly, other embodiments are within the scope of the following claims.

What is claimed is:

1. A method of managing power at an element management system for a power sourcing network element and a power sinking network element in an access network, the method comprising:
provisioning at least one instance of a line power manager with at least one primitive;
provisioning at least one instance of an associated line power controller at each of the power sourcing network element and the power sinking network element;
associating at least one conductive medium with the line power controller, the at least one conductive medium coupled between the power sourcing network element and the power sinking network element;
passing selected ones of the at least one primitive to at least one of the power sourcing network element and the power sinking network element for use by functions of the power sourcing and power sinking network elements performing the power management;
monitoring at least one of the at least one primitive; and
selectively taking action at the element management system based on monitored ones of the at least one primitive in response to power conditions for the power sourcing and power sinking network elements.

2. The method of claim 1, wherein selectively taking action comprises displaying an alarm in response to an adverse power condition for one of the power sourcing and power sinking network elements.

3. The method of claim 2, wherein displaying the alarm comprises displaying the alarm on a graphical user interface.

4. The method of claim 1, wherein provisioning at least one instance of the line power manager comprises selecting one or more primitives based on a power profile associated with a provisioned service type.

5. The method of claim 1, wherein provisioning at least one instance of a line power manager with at least one primitive comprises provisioning at least one instance of a line power manager with information and parameters that define a set of power management actions and criteria for the provisioned service.

6. The method of claim 1, wherein provisioning at least one instance of the line power manager comprises selecting one or more primitives at a user interface.

7. The method of claim 1, further comprising managing a database of primitives associated with each instance of the power manager.

8. The method of claim 1, wherein passing selected ones of the primitive to at least one of the power sourcing network element and the power sinking network element comprises passing selected primitives to the power sourcing network element for managing power at the power sinking network element.

9. The method of claim 1, wherein passing selected ones of the primitive to at least one of the power sourcing network element and the power sinking network element comprises passing selected primitives to the power sinking network element for managing power at the power sinking network element.

10. The method of claim 1, wherein associating at least one conductive medium with the line power controller comprises associating at least one conductive medium that also transports communication signals.

11. The method of claim 1, wherein associating at least one conductive medium with the line power controller comprises associating at least one conductive medium with at least one media interface.

12. A method of managing power at an element management system for a power sourcing network element and a power sinking network element of an access network, the method comprising:
   establishing a service for a subscriber interface of the power sinking network element;
   identifying a set of primitives for managing power usage at the power sinking network element associated with providing the service;
   provisioning at least one instance of a line power manager for the service with the set of primitives;
   provisioning at least one instance of an associated line power controller at each of the power sourcing network element and the power sinking network element;
   associating at least one conductive medium with the line power controller, the at least one conductive medium coupled between the power sourcing network element and the power sinking network element;
   passing selected ones of the set of primitives to the power sourcing network element and the power sinking network element for use by at least one line power control function of the power sourcing network element and the power sinking network element; and
   associating the set of primitives with the instance of the line power manager in a database at the element management system.

13. The method of claim 12, wherein identifying a set of primitives comprises one of automatically selecting a set of primitives from a power profile associated with the provisioned service type, selecting primitives through a user interface, and selecting a power profile having a set of primitives to be associated with the provisioned service.

14. The method of claim 12, wherein passing selected ones of the primitives to the power sourcing network element and the power sinking network element comprises passing selected primitives to the power sourcing network element for managing power at the power sinking network element.

15. The method of claim 12, wherein passing selected ones of the primitives to the power sourcing network element and the power sinking network element comprises passing selected primitives to the power sinking network element for managing power at the power sinking network element.

16. The method of claim 12, further comprising managing a database of primitives associated with each instance of the power manager.

17. The method of claim 12, wherein associating at least one conductive medium with the line power controller comprises associating at least one conductive medium that also transports communication signals.

18. The method of claim 12, wherein associating at least one conductive medium with the line power controller comprises associating at least one conductive medium with at least one media interface.

19. A method of managing power at an element management system for a power sourcing network element and a power sinking network element of an access network, the method comprising:
   provisioning a service for a subscriber interface of the power sinking network element;
   automatically selecting a set of primitives for managing power usage at the power sinking network element based on the provisioned service;
   provisioning at least one instance of a line power manager for the service with the set of primitives;
   provisioning at least one instance of an associated line power controller at each of the power sourcing network element and the power sinking network element;
   associating at least one conductive medium with the line power controller, the at least one conductive medium coupled between the power sourcing network element and the power sinking network element; and
   passing selected ones of the set of primitives to the power sourcing network element and the power sinking network element for use by at least one line power control function of the power sourcing network element and the power sinking network element.

20. A method of managing power at an element management system for a power sourcing network element and a power sinking network element of an access network, the method comprising:
   provisioning a service for a subscriber interface of the power sinking network element;
   receiving selections for a set of primitives for managing power usage at the power sinking network element for the provisioned service;
   provisioning at least one instance of a line power manager for the service with the set of primitives;
   provisioning at least one instance of an associated line power controller at each of the power sourcing network element and the power sinking network element;
   associating at least one conductive medium with the line power controller, the at least one conductive medium coupled between the power sourcing network element and the power sinking network element; and
   passing selected ones of the set of primitives to the power sourcing network element and the power sinking network element for use by at least one line power control function of the power sourcing network element and the power sinking network element.

21. The method of claim 20, wherein associating at least one conductive medium with the line power controller comprises associating at least one conductive medium that also transports communication signals.

22. The method of claim 20, wherein associating at least one conductive medium with the line power controller comprises associating at least one conductive medium with at least one media interface.

23. Apparatus comprising a storage medium tangibly embodying program instructions for managing power at an element management system for a power sourcing network element and a power sinking network element in an access network, the program instructions including instructions operable to cause at least one programmable processor to execute a method comprising:

provisioning at least one instance of a line power manager with at least one primitive;

provisioning at least one instance of an associated line power controller at each of the power sourcing network element and the power sinking network element;

associating at least one conductive medium with the line power controller, the at least one conductive medium coupled between the power sourcing network element and the power sinking network element;

passing selected ones of the at least one primitive to at least one of the power sourcing network element and the power sinking network element for use by functions of the power sourcing and power sinking network elements performing the power management;

monitoring at least one of the at least one primitive; and selectively taking action at the element management system based on monitored ones of the at least one primitive in response to power conditions for the power sourcing and power sinking network elements.

24. The apparatus of claim 23, wherein selectively taking action comprises displaying an alarm in response to an adverse power condition for one of the power sourcing and power sinking network elements.

25. The apparatus of claim 24, wherein displaying the alarm comprises displaying the alarm on a graphical user interface.

26. The apparatus of claim 23, wherein provisioning at least one instance of the line power manager comprises selecting one or more primitives based on a power profile associated with a provisioned service type.

27. The apparatus of claim 23, wherein provisioning at least one instance of a line power manager with at least one primitive comprises provisioning at least one instance of a line power manager with information and parameters that define a set of power management actions and criteria for the provisioned service.

28. The apparatus of claim 23, wherein provisioning at least one instance of the line power manager comprises selecting one or more primitives at a user interface.

29. The apparatus of claim 23, further comprising managing a database of primitives associated with each instance of the line power manager.

30. The apparatus of claim 23, wherein passing selected ones of the primitive to at least one of the power sourcing network element and the power sinking network element comprises passing selected primitives to the power sourcing network element for managing power at the power sinking network element.

31. The apparatus of claim 23, wherein passing selected ones of the primitive to at least one of the power sourcing network element and the power sinking network element comprises passing selected primitives to the power sinking network element for managing power at the power sinking network element.

32. The apparatus of claim 23, wherein associating at least one conductive medium with the line power controller comprises associating at least one conductive medium that also transports communication signals.

33. The apparatus of claim 23, wherein associating at least one conductive medium with the line power controller comprises associating at least one conductive medium with at least one media interface.

34. Apparatus comprising a storage medium tangibly embodying program instructions for managing power at an element management system for a power sourcing network element and a power sinking network element in an access network, the program instructions including instructions operable to cause at least one programmable processor to execute a method comprising:

establishing a service for a subscriber interface of the power sinking network element;

identifying a set of primitives for managing power usage at the power sinking network element associated with providing the service;

provisioning at least one instance of a line power manager for the service with the set of primitives;

provisioning at least one instance of an associated line power controller at each of the power sourcing network element and the power sinking network element;

associating at least one conductive medium with the line power controller, the at least one conductive medium coupled between the power sourcing network element and the power sinking network element;

passing selected ones of the set of primitives to the power sourcing network element and the power sinking network element for use by at least one line power control function of the power sourcing network element and the power sinking network element; and associating the set of primitives with the instance of the line power manager in a database at the element management system.

35. The apparatus of claim 34, wherein identifying a set of primitives comprises one of automatically selecting a set of primitives from a power profile associated with the provisioned service type, selecting primitives through a user interface, and selecting a power profile having a set of primitives to be associated with the provisioned service.

36. The apparatus of claim 34, wherein passing selected ones of the primitive to the power sourcing network element and the power sinking network element comprises passing selected primitives to the power sourcing network element for managing power at the power sinking network element.

37. The apparatus of claim 34, wherein passing selected ones of the primitive to the power sourcing network element and the power sinking network element comprises passing selected primitives to the power sinking network element for managing power at the power sinking network element.

38. The apparatus of claim 34, and further comprises managing a database of primitives associated with each instance of the power manager.

39. The apparatus of claim 34, wherein associating at least one conductive medium with the line power controller comprises associating at least one conductive medium that also transports communication signals.

40. The apparatus of claim 34, wherein associating at least one conductive medium with the line power controller comprises associating at least one conductive medium with at least one media interface.

41. Apparatus comprising a storage medium tangibly embodying program instructions for managing power at an element management system for a power sourcing network element and a power sinking network element in an access network, the program instructions including instructions operable to cause at least one programmable processor to execute a method comprising:

provisioning a service for a subscriber interface of the power sinking network element;

automatically selecting a set of primitives for managing power usage at the power sinking network element based on the provisioned service;

provisioning at least one instance of a line power manager for the service with the set of primitives;

provisioning at least one instance of an associated line power controller at each of the power sourcing network element and the power sinking network element;

associating at least one conductive medium with the line power controller, the at least one conductive medium coupled between the power sourcing network element and the power sinking network element; and passing selected ones of the set of primitives to the power sourcing network element and the power sinking network element for use by at least one line power control function of the power sourcing network element and the power sinking network element.

42. Apparatus comprising a storage medium tangibly embodying program instructions for managing power at an element management system for a power sourcing network element and a power sinking network element in an access network, the program instructions including instructions operable to cause at least one programmable processor to execute a method comprising:

provisioning a service for a subscriber interface of the power sinking network element;

receiving selections for a set of primitives for managing power usage at the power sinking network element for the provisioned service;

provisioning at least one instance of a line power manager for the service with the set of primitives;

provisioning at least one instance of an associated line power controller at each of the power sourcing network element and the power sinking network element;

associating at least one conductive medium with the line power controller, the at least one conductive medium coupled between the power sourcing network element and the power sinking network element; and passing selected ones of the set of primitives to the power sourcing network element and the power sinking network element for use by at least one line power control function of the power sourcing network element and the power sinking network element.

43. A method of managing power at an element management system for a power sourcing network element and a power sinking network element of an access network, the method comprising:

identifying a set of primitives for managing power usage at the power sinking network element associated with providing a provisioned service;

provisioning at least one instance of a line power manager for the service with the set of primitives;

provisioning at least one instance of an associated line power controller at each of the power sourcing network element and the power sinking network element;

associating at least one conductive medium with the line power controller, the at least one conductive medium coupled between the power sourcing network element and the power sinking network element; and passing selected ones of the set of primitives to the power sourcing network element and the power sinking network element for use by at least one line power control function of the power sourcing and the power sinking network elements.

* * * * *

UNITED STATES PATENT AND TRADEMARK OFFICE
CERTIFICATE OF CORRECTION

PATENT NO. : 7,599,484 B2 Page 1 of 1
APPLICATION NO. : 10/449682
DATED : October 6, 2009
INVENTOR(S) : Dieter H. Nattkemper It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 403 days.

Signed and Sealed this

Twenty-eighth Day of September, 2010

David J. Kappos
*Director of the United States Patent and Trademark Office*